(12) United States Patent
Reuschel

(10) Patent No.: US 6,171,212 B1
(45) Date of Patent: Jan. 9, 2001

(54) METHOD OF AND APPARATUS FOR CONTROLLING THE OPERATION OF A CLUTCH IN THE POWER TRAIN OF A MOTOR VEHICLE

(75) Inventor: Michael Reuschel, Bühl (DE)

(73) Assignee: Luk Getriebe Systeme GmbH, Buhl/Baden (DE)

( * ) Notice: Under 35 U.S.C. 154(b), the term of this patent shall be extended for 0 days.

(21) Appl. No.: 09/134,464

(22) Filed: Aug. 14, 1998

(30) Foreign Application Priority Data

Aug. 26, 1997 (DE) .............................................. 197 37 021

(51) Int. Cl.$^7$ ...................................................... F16D 48/06
(52) U.S. Cl. ............................. 477/86; 477/166; 477/174
(58) Field of Search ............................... 477/82–86, 166, 477/169, 174

(56) References Cited

U.S. PATENT DOCUMENTS

| | | | |
|---|---|---|---|
| 4,561,530 | * | 12/1985 | Parsons et al. ..................... 477/86 X |
| 4,638,898 | * | 1/1987 | Braun ..................................... 477/86 |
| 4,825,991 | * | 5/1989 | Ohkumo ................................. 477/86 |
| 4,971,183 | * | 11/1990 | Tellert ..................................... 477/86 |
| 5,065,849 | * | 11/1991 | Kono et al. ............................. 477/86 |
| 5,283,738 | * | 2/1994 | Schwab et al. ..................... 477/86 X |
| 5,293,316 | * | 3/1994 | Slicker ............................... 477/86 X |
| 5,383,823 | * | 1/1995 | Ward et al. ............................. 477/86 |
| 5,409,091 | | 4/1995 | Reik et al. . |
| 5,439,428 | * | 8/1995 | Slicker ............................... 477/86 X |
| 5,450,934 | | 9/1995 | Maucher . |
| 5,632,706 | | 5/1997 | Kremmling et al. . |
| 5,667,448 | | 9/1997 | Friedmann . |

* cited by examiner

Primary Examiner—Khoi Q. Ta
(74) Attorney, Agent, or Firm—Darby & Darby

(57) ABSTRACT

The extent of engagement of an automatically adjustable friction clutch in the power train of a motor vehicle, wherein the clutch receives torque from a rotary output element of an engine and transmits torque to the rotary input element of a transmission, is determined by an electronic control unit in conjunction with an actuator which is responsive to signals from the control unit. Under normal circumstances, the adjustment of the clutch is selected on the basis of control signals which depend upon the actual RPM of the output element and the RPM of the input element. When the actual RPM of the output element departs from a desired RPM, the control signal is altered to reduce the rate of torque transmission by the clutch upon a determination that the actual RPM is below the desired RPM, and to increase the rate of torque transmission by the clutch when the actual RPM exceeds the desired RPM.

13 Claims, 2 Drawing Sheets

METHOD OF AND APPARATUS FOR CONTROLLING THE OPERATION OF A CLUTCH IN THE POWER TRAIN OF A MOTOR VEHICLE

BACKGROUND OF THE INVENTION

The invention relates to power trains of motor vehicles in general, and more particularly to improvements in methods of and in apparatus for operating adjustable torque transmitting systems (e.g., in the form of engageable and disengageable friction clutches) of such power trains.

As a rule, or at least in many instances, the operation of the friction clutch in the power train of a motor vehicle (normally but not necessarily between the rotary output element of a prime mover and the rotary input element of a change-speed transmission) is regulated automatically by one or more actuators (e.g., electric motors in conjunction with gearings and/or fluid-operated cylinder and piston units) which receives or receive signals from a computerized control unit. The control unit normally processes signals denoting various operational parameters of the motor vehicle and/or of its power train; and its output signal to the actuator or actuators reflects the intensity or intensities (and/or other characteristics) of the signal or signals being processed by the evaluating circuit or circuits of the control unit.

An advantage of an automatically operated torque transmitting system (hereinafter called clutch or friction clutch for short) is that it contributes considerably to the comfort of the operator and other occupant(s) (if any) of a motor vehicle. Furthermore, the utilization of an automatically engageable and disengageable friction clutch can entail a reduction of fuel consumption, especially when the clutch is connected between the crankshaft or camshaft of an internal combustion engine (such as an Otto engine) and the input shaft of an automated or automatic transmission in the power train of a motor vehicle. Such types of power trains are more likely to ensure an automatic selection of a transmission ratio which is best suited for the transmission of torque to the driven wheels of the motor vehicle, namely which is most likely to ensure a highly economical operation of the engine under the prevailing circumstances of use of the motor vehicle.

In order to reduce the energy consumption of the associated actuator or actuators, as well as to ensure speedy adjustments of the magnitude of transmitted torque, an automated clutch is normally operated in such a way that the extent of its engagement is best suited for operation without slip or without undue (excessive) slip. To this end, it is customary to select the extent of engagement of the clutch as a function of the RPM of the rotary output element of the prime mover, of the RPM of the rotary input element of the transmission (such RPM is normally indicative (or it can be utilized for a determination) of the speed of the motor vehicle), and the load upon the prime mover in such a way that the clutch can transmit a predetermined torque.

However, when the circumstances of use of a motor vehicle depart from normal circumstances, for example, when the vehicle is utilized on mountain roads or elsewhere well above the sea level (turbo engines are particularly sensitive under such circumstances of use), when the outside temperature is very low, and/or under certain other circumstances, it can happen (especially while setting the vehicle in motion) that the disengagement of the clutch is excessive which prevents the engine from reaching an RPM at which it can or could furnish a maximum torque. This can prevent the engine from developing an adequate power during starting of the motor vehicle.

The RPM of a rotary input element of a manually shiftable, automated or automatic transmission (such as a continuously variable transmission known as CVT) can be ascertained on the basis of the transmission ratio and the rotary output element of the transmission (e.g., a shafty which drives the differential of the power train) or by resorting to suitable sensor means.

OBJECTS OF THE INVENTION

An object of the invention is to provide a reliable and economical method of operating a torque transmitting system (such as a friction clutch, another clutch or a hydrokinetic torque converter with a bypass clutch) in the power train of a motor vehicle.

Another object of the invention is to provide a method which renders it possible to select an optimum RPM of the output element in the prime mover of a motor vehicle even if the temperature and/or other conditions (such as the elevation above the sea level) are not ideally suited for the utilization of heretofore known automatic operating means for friction clutches and the like.

A further object of the invention is to provide a method which renders it possible to reliably select the extent of engagement of a friction clutch by full consideration of all relevant parameters of the motor vehicle and its power train.

An additional object of the invention is to provide a method which can be practiced in power trains embodying numerous presently known and available components such as a prime mover, a transmission, a friction clutch, one or more actuators for the friction clutch and/or others.

Still another object of the invention is to provide a power train which can be operated in accordance with the above outlined method.

A further object of the invention is to provide a motor vehicle which embodies the above outlined power train and which can operate satisfactorily under circumstances that permit for acceptable operation of vehicles embodying conventional power trains as well as under circumstances which do not allow for a satisfactory utilization of heretofore known power trains.

Another object of the instant invention is to provide a novel and improved computerized control unit which determines the operation of the actuator or actuators for automated torque transmitting systems (such as friction clutches, other types of clutches or hydrokinetic torque converters with bypass or lockup clutches) in the power trains of passenger cars and/or other types of motor vehicles.

An additional object of the present invention is to provide a control unit which can process various signals in a novel and improved way and can transmit appropriate signals to the actuator or actuators for an automated friction clutch or another torque transmitting system.

Still another object of the invention is to provide a novel and improved method of ensuring satisfactory operation of power trains in motor vehicles on terrain well above the sea level and at temperatures which considerably depart from average temperatures.

SUMMARY OF THE INVENTION

One feature of the present invention resides in the provision of a method of varying the rate of torque transmission by an adjustable torque transmitting system (such as a friction clutch) in a power train forming part of a motor vehicle and having a prime mover (such as an Otto engine or a Diesel engine) with an output element (such as a camshaft or a crankshaft) rotatable at RPMs at times exceeding and at times below a desired or required optimum RPM. The improved method comprises the steps of monitoring the actual RPM of the output element of the prime mover, reducing the rate of torque transmission by the torque transmitting system when the monitored RPM of the output element of the prime mover is below the desired RPM, and increasing the rate of torque transmission by the torque transmitting system when the monitored RPM of the output element of the prime mover exceeds the desired RPM.

If the method involves varying the rate of torque transmission in a power train wherein the prime mover is subject to variable loads and the torque transmitting system transmits torque to a rotary input element of a mechanical, automated or automatic change-speed transmission, such method can further comprise the steps of generating first signals which denote the monitored RPM of the output element of the prime mover, ascertaining the desired RPM of the output element of the prime mover (this can include monitoring the RPM of the input element of the transmission and generating second signals denoting the monitored RPM of such input element, monitoring the load upon the prime mover and generating third signals which denote the monitored load upon the prime mover, and processing the second and third signals into fourth signals which denote the desired RPM of the prime mover), and generating control signals including processing the first and second signals. The steps of reducing and increasing the rate of torque transmission by the torque transmitting system then preferably include comparing the control signals with the fourth signals.

The step of reducing the rate of torque transmission by the torque transmitting system to the input element of the transmission can further include subtracting the fourth signals from the control signals, and the step of increasing the rate of torque transmission by the torque transmitting system to the input element of the transmission can further include adding the fourth signals to the control signals.

When considered by itself, the step of ascertaining the desired RPM of the output element includes monitoring the actual or momentary RPM of the input element of the transmission and generating signals denoting the monitored RPM of the input element, monitoring the load upon the prime mover and generating additional signals which denote the actual or momentary load upon the prime mover, and processing the first mentioned and additional signals into further signals which denote or represent or are indicative of the desired RPM of the output element of the prime mover.

The aforediscussed method can further comprise the steps of establishing a difference (if any) between the first and fourth signals, and performing upon the fourth signals a gradient limitation in dependency upon two variables (namely (a) the established difference between the first and fourth signals, and (b) the third signals) to thus generate fifth signals. The steps of reducing and increasing the rate of torque transmission by the torque transmitting system then further include comparing the control signals with the fifth signals.

The just mentioned method can be modified by the addition of a further step which includes processing the fifth signals in a regulator to thus generate sixth signals; the steps of reducing and increasing the rate of torque transmission by the torque transmitting system then include comparing the control signals with the sixth signals.

The regulator can be of the type having inputs for the first and fifth signals, and such regulator can be arranged to compare the first and fifth signals and generate the aforementioned sixth signals when the comparison between the first and fifth signals indicates the existence or presence of a difference exceeding a predetermined value.

Alternatively, the regulator can be of the type having inputs for the first and fourth signals, and such regulator can be arranged to compare the first and fourth signals and to generate the sixth signals when the comparison between the first and fourth signals reveals or indicates the existence of a difference exceeding a preselected value.

The regulator can constitute a PI regulator.

It is often preferred to select a regulator having a characteristic which is a function of the monitored RPM of the output element of the prime mover.

If the chosen regulator has adjustable integral and proportional shares, the method can further comprise the step of setting the shares to zero when the monitored RPM of the output element of the prime mover is below a predetermined RPM.

The aforementioned step of generating control signals can include processing the first and second signals (i.e., signals denoting the monitored RPM of the output element of the prime mover, and signals denoting the ascertained RPM of the input element of the transmission) as well as additional signals which are generated by the regulator. Such additional signals can be indicative of the activity of the regulator.

Under certain circumstances, the improved method can comprise the steps of monitoring the RPM of the output element of the prime mover, reducing the rate of torque transmission by the torque transmitting system when the monitored RPM of the output element is below the desired RPM, increasing the rate of torque transmission by the torque transmitting system when the monitored RPM of the output element exceeds the desired RPM, respectively generating first and second signals which denote the monitored RPM and the desired RPM of the output element of the prime mover, and processing the first and second signals. The steps of reducing and increasing the rate of torque transmission by the torque transmitting system then include adjusting the torque transmitting system as a function of the processed first and second signals.

The just mentioned processing step can include subtracting processed second signals from processed first signals when the monitored RPM of the output element of the prime mover is below the desired RPM, and adding processed second signals to processed first signals when the monitored RPM of the output element of the prime mover is above the desired RPM.

Another feature of the invention resides in the provision of a novel and improved power train for a motor vehicle. The power train comprises a prime mover having an output element which is rotatable at a plurality of different RPMs including a desired or optimal or required RPM, an adjustable torque transmitting system (such as a friction clutch) driven by the output element of the prime mover, and means for operating the torque transmitting system. The operating means includes means for monitoring the RPM of the output element of the prime mover, means for comparing the monitored RPM with the desired RPM of the output element of the prime mover, and means for adjusting the torque transmitting system in such a way that the torque being transmitted by the torque transmitting system is being reduced when the monitored RPM of the output element of the prime mover is below the desired RPM and that the torque being transmitted by the torque transmitting system is being increased when the monitored RPM of the output element of the prime mover is above the desired RPM.

The operating means can further comprise means for ascertaining the desired RPM, and such ascertaining means can include means for generating first signals denoting the monitored RPM, means for generating second signals denoting the magnitude of the load upon the prime mover, and means for processing the first and second signals into third signals denoting the desired RPM. Such operating means can further comprise means (such as a PI regulator) for regulating the third signals.

The power train can further comprise a transmission having a rotary input element which receives torque from the torque transmitting system. The operating means of such power train can further comprise means for generating first signals which denote the monitored RPM of the output element of the prime mover, means for monitoring the RPM of the input element of the transmission, means for generating second signals which denote the monitored RPM of the input element of the transmission, means for processing the first and second signals into control signals, and actuator means responsive to the control signals to adjust the torque transmitting system for transmission to the input element of the transmission of a torque which is a function of the control signals.

The novel features which are considered as characteristic of the invention are set forth in particular in the appended claims. The improved power train itself, however, both as to its construction and the modes of assembling and operating the same in accordance with the improved method, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
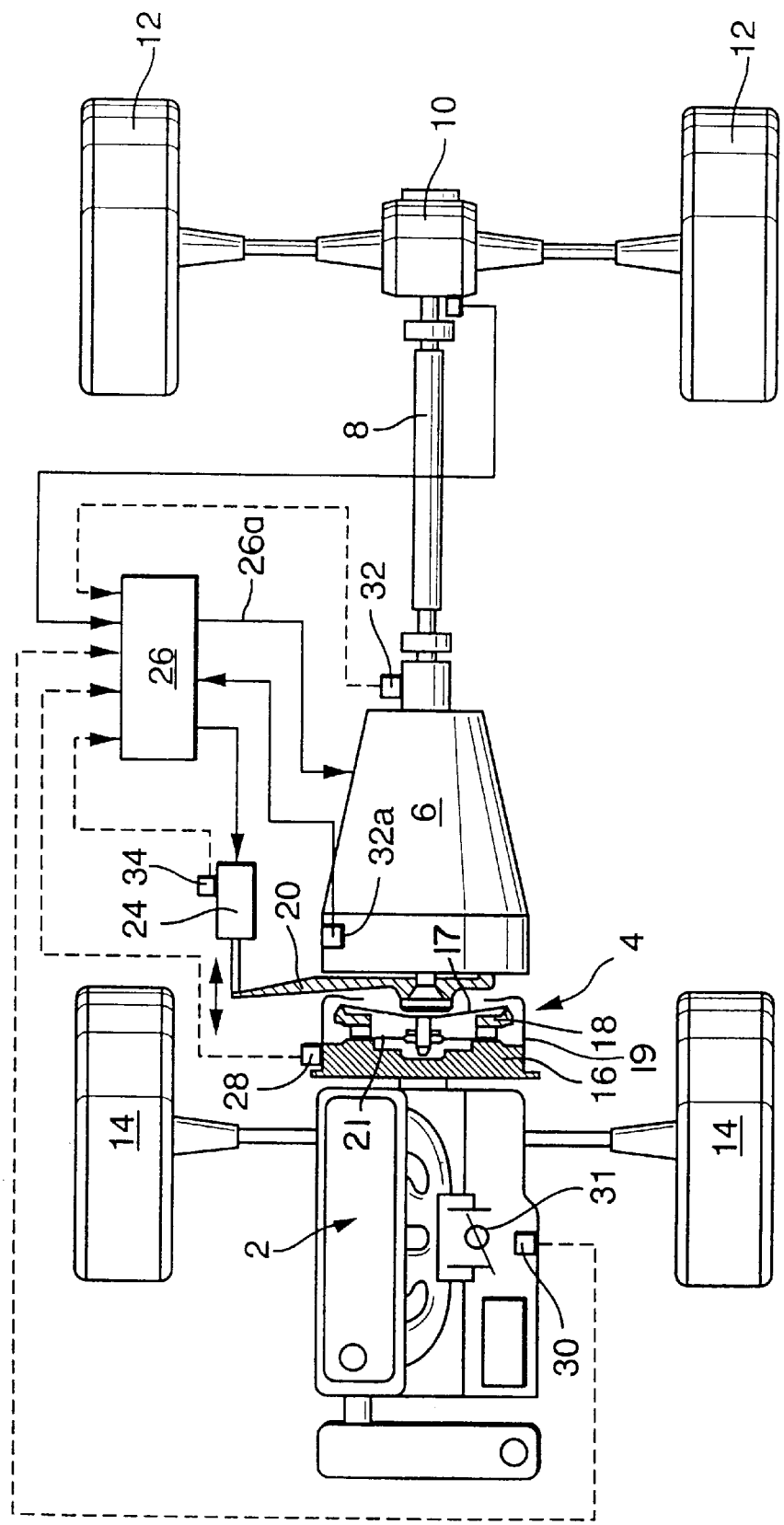
FIG. 1 is a fragmentary schematic plan view of a motor vehicle wherein the power train includes an automated torque transmitting system which can be operated in accordance with the method of the present invention.

FIG. 1 shows a portion of a motor vehicle having a power train including a prime mover 2 (such as an internal combustion (Otto) engine) with a rotary output element (such as a camshaft or a crankshaft) which drives a flywheel 16 constituting the counterpressure plate of an automated torque transmitting system 4 in the form of a friction clutch 4 further having an axially movable pressure plate 18 biased by a clutch spring 17 which reacts against a clutch housing 19. When the clutch 4 is at least partially engaged, the clutch spring 17 reacts against the housing 19 and causes the pressure plate 18 to urge the friction linings of a rotary clutch disc or clutch plate 21 against the adjacent friction surface of the flywheel 16 so that the clutch disc 21 can rotate the input element (e.g., a shaft) of an automated transmission 6. The output shaft 8 of the transmission 6 drives a differential 10 for the axles of the rear wheels 12 of the motor vehicle. The front wheels 14 of the illustrated motor vehicle are not driven.

The clutch 4 further comprises a pivotable lever 21 which can receive motion from an actuator 24 in order to change the extent of engagement of the clutch, i.e., the rate of torque transmission between the output element of the engine 2 and the input element of the transmission 6.

The clutch 4 can be an automatically adjustable torque transmitting system of the type disclosed, for example, in commonly owned U.S. Pat. No. 5,409,091 granted Apr. 25, 1995 to Wolfgang Reik et al. for "AUTOMATICALLY ADJUSTABLE CLUTCH", or in commonly owned U.S. Pat. No. 5,450,934 granted Sep. 19, 1995 to Paul Maucher for "FRICTION CLUTCH". The disclosures of all patents and any other publications mentioned in this specification are incorporated herein by reference.

The transmission 6 can be a continuously variable transmission (CVT) of the type disclosed, for example, in commonly owned U.S. Pat. No. 5,667,448 granted Sep. 16, 1997 to Oswald Friedmann for "POWER TRAIN".

The illustrated friction clutch 4 can be replaced with any one of a number of different automated clutches including a wet disc clutch which can be installed in the case of the transmission 6; such wet clutch can be caused to change the magnitude of transmitted torque in response to actuation by a fluid-operated motor which is integrated into the transmission case. Reference may be had, for example, to commonly owned U.S. Pat. No. 5,632,706 granted May 27, 1997 to Burkard Kremmling et al. for "MOTOR VEHICLE WITH ELECTRONIC CLUTCH MANAGEMENT SYSTEM"; this patent shows an electronic clutch management system (ECM) wherein a lever (20) corresponding to the lever 20 in FIG. 1 of the present application is actuated by a hydraulic actuator assembly serving to ensure that the clutch can operate without slip (full engagement) or with an optimum slip (partial engagement).

In FIG. 1, the actuator 24 for the clutch operating lever 20 is assumed to comprise an electric stepping motor receiving appropriate signals $S_{Kk}$ (see FIG. 2) from an electronic control unit 26. One presently preferred electronic control unit will be described in requisite detail with reference to FIG. 2. However, it is to be understood that the actuator 24 and/or an equivalent actuator, such as a fluid-operated motor and slave cylinder unit of the type shown in U.S. Pat. No. 5,632,706 to Kremmling et al., can be utilized with equal or similar advantage in combination with other types of control units, and that a thus actuatable automated clutch can be utilized with advantage in conjunction with other types of automated transmissions.

The illustrated control unit 26 is assumed to comprise a ROM (read-only memory), a programmable memory RAM (random-access memory), and (if necessary) input and output signal converters. The exact construction of such control circuits is well known and, therefore, all details of the illustrated control unit 26 will not be described.

The inputs of the control unit 26 receive signals from various monitoring and signal generating devices. FIG. 1 shows a signal generator 28 which monitors the RPM of the rotary output element of the engine 2 (by monitoring, for example, the RPM of the clutch housing 19 which is rotated by the flywheel 4, i.e., by the output element of the engine), a sensor 30 which monitors the load upon the engine 2 by monitoring the position of the flap of a throttle valve 31, and a sensor 32 which monitors the RPM of the output element of the transmission 6. The signals from the sensor 32 can be processed to indicate the forward or rearward speed of the motor vehicle by taking into consideration the ratio of the transmission 6 and the diameters of the driven wheels 12.

FIG. 1 further shows a sensor 32a which monitors the RPM of the rotary input element of the transmission 6, and a sensor 34 which monitors the position of a mobile part of the actuator 24, i.e., the position of the lever 20 and hence the extent of engagement (including zero engagement and full engagement) of the clutch 4.

The signals from the just enumerated sensors (and, if necessary, from one or more additional sensors) are applied to the respective inputs of the control unit 26 which transmits signals $S_K$ (FIG. 2) to the actuator 24 for an adjustment of the clutch 4 as well as signals (via conductor means 26a shown in FIG. 1) for an adjustment of the automated transmission 6. Automatic and automated clutches and transmissions are well known in the relevant art and need not be described here. Reference may be had, for example, to "MODERN AUTOMOTIVE TECHNOLOGY" by James E. Duffy (1994 Edition, published by The Goodheart-Willcox Company, Inc., Tinley Park, Ill.).

Basically, the control unit 26 regulates the operation of the clutch 4 in such a way that the clutch can transmit a desired or required torque which is a function of engine output RPM $n_M$, the transmission input RPM $n_G$, and the position (such as inclination) of the flap of the throttle valve 31. In other words, the control unit 26 processes signals from the sensors 28, 30 and 32a. The control unit 26 normally transmits to the actuator 24 a control signal $S_K$ which causes the actuator to assume a corresponding condition, i.e., the lever 20 is caused to assume a position which enables the clutch 4 to transmit an appropriate torque. Otherwise stated, the clutch 4 then assumes a condition of engagement which is a function of the intensity and/or other characteristics of the control signal $S_K$ from the output of the control unit 26 to the input of the actuator 24.

The algorithm which is stored in the control unit 26 contains the customary proportionality (proportional-action) factor which is multiplied by desired or required torque calculated on the basis of signals denoting the engine RPM $n_M$ and the position of the flap of the throttle valve 31 (and memorized in a characteristic field) and, if necessary, by a factor denoting the relationoship between the engine RPM $n_M$ and the transmission input RPM $n_G$.

Changes of additional variables, such as for example air pressure, very low operational temperatures, changes of friction between parts which are components of the clutch 4 and rotate and/or otherwise move relative to each other, and/or changes of certain other parameters can entail that the engine does not actually reach predetermined RPMs which correspond to its maximum torque or maximum output. This can take place particularly while the motor vehicle is being set in motion, for example, if the clutch is engaged prematurely merely in response to a control signal $S_K$ but the engine is yet to furnish a desired torque. In order to remedy or prevent the development of such and other undesirable circumstances, a regulation which will be explained with reference to the block diagram of FIG. 2 is superimposed upon the controlled actuation of the clutch 4, i.e., the control unit 24 then receives a signal ($S_{Kr}$) which is a modification of the control signal $S_K$.

Figure 2:
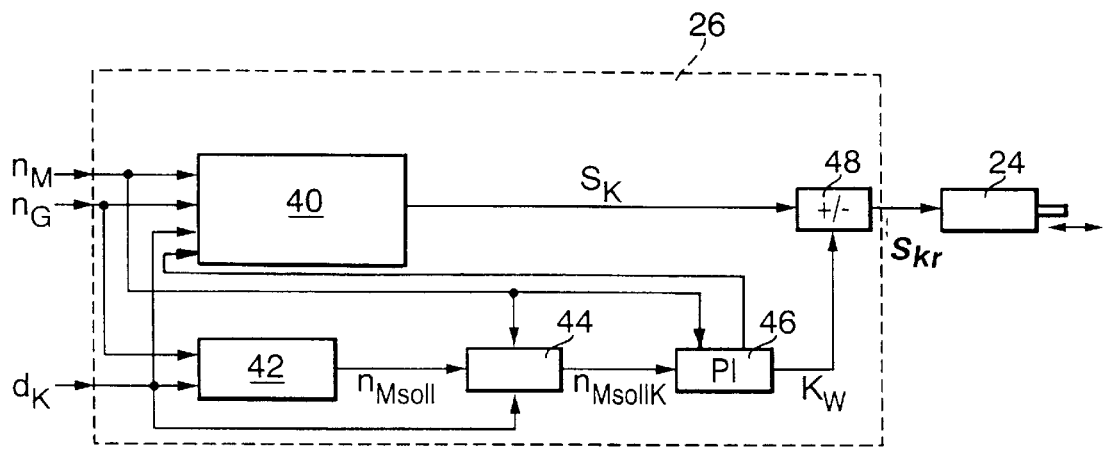
FIG. 2 is a block diagram of an electronic control unit for an actuator which serves to adjust the torque transmitting system in accordance with the improved method.

The blocks in the diagram of FIG. 2 denote the logic and processing circuits of one presently preferred control unit 26. These blocks can denote software or discete modules; the following description is based on the assumption that the illustrated blocks are modules.

The block 40 represents, for example, a module which serves to calculate the clutch control signals $S_K$ in a manner as outlined hereinbefore. The torque which the clutch 4 can transmit in response to transmission of a, control signal $S_K$ from the module 40 of the control unit 26 to the input of the actuator 24 is calculated or determined in the module denoted by the block 40. This can be effected, for example, by resorting to the following equation:

$$S_K = k_{\_22} * V * M(n_M, d_K).$$

Such advance or preliminary regulation or calculation of the clutch torque, or of the torque which can be transmitted by the clutch, is superimposed (when necessary) upon a regulation represented by a correction or reference signal $K_W$ which is ascertained by the modules represented by the blocks 42, 44 and 46 in the diagram of FIG. 2. The purpose of the factor $k_{\_22}$ in the above equation is to render variable the shares of initial or preliminary control and of the regulation. This factor can be made variable in dependency upon the operational parameters of the power train or the engine.

The factor V in the above equation denotes a variable amplification factor, and $M(n_M, d_K)$ denotes a torque which is a function of the engine RPM $n_M$ and of the position or orientation (such as angle) $d_K$ of the flap of the throttle valve 31. In lieu of the signal ($d_K$) denoting the angle of the flap of the throttle valve, it is also possible to resort to a signal which is proportional to or is otherwise representative of such angle (i.e., of the load upon the engine 2). Thus, the clutch torque M can be selected as a function of the engine torque (which can be readily arrived at on the basis of the aforediscussed variables, namely the position of the flap of the throttle valve 31 (signal $d_K$ from the sensor 30) and the actual or monitored engine RPM $n_M$ (signal from the sensor 28).

The block 42 denotes a module wherein signals representing the input RPM $n_G$ of the transmission 6 and the position $d_K$ of the flap of the throttle valve 31 are processed to calculate the desired or required engine RPM $n_{MSoll}$. For example, the required or desired engine RPM $n_{MSoll}$ can be read out of a characteristic field which is stored in the module represented by the block 42 in the diagram of FIG. 2 and can correspond, for example, to an RPM at which the engine 2 can transmit a certain torque when the throttle valve 31 is nearly fully open and the vehicle speed is very low. On the other hand, when the throttle valve 31 is fully open, the required engine RPM $n_{MSoll}$ corresponds to the RPM when the engine power has reached a maximum value. By taking into consideration the transmission input RPM $n_G$, one achieves a gradual approximation of the transmission input RPM $n_G$ to the engine RPM $n_M$.

It is also possible to ascertain (calculate or determine) the desired or required engine RPM by resorting to a numerical procedure as follows:

$$n_{MSoll} = f(n_G, d_K).$$

The module denoted by the block 44 performs a gradient limitation of the calculated desired or required engine RPM $n_{MSoll}$ (dn/dt is not set to exceed a preselectable value, even if the gradient has been calculated to be larger), and this involves a consideration of the difference between the momentary (then prevailing) engine RPM $n_M$ and the value $n_{MSoll}$ as well as the position of the flap of the throttle valve. At such time, the permissible change, i.e., the permissble gradient of the output signal $n_{MSollk}$ which is transmitted by the module denoted by the block 44 ("k" denotes "corrected"), is reduced in response to a reduction of the difference between $n_M$ and $n_{MSoll}$ so that, and as will be fully described hereinafter, one achieves a smooth transition of the actual engine RPM into a desired or required engine RPM.

An advantage of taking into consideration the position or condition of the throttle valve 31 (such as the inclination of its flap) is that, when the extent of depression of the gas pedal is reduced or the depression of the gas pedal is interrupted, a fresh and much lower value of $n_{MSoll}$ is not effective in an abrupt manner but becomes effective with a certain delay. Thus, the module represented by the block 44 can be said to perform the function of a filter which serves to smooth successively developing changes and the characteristic of which depends upon $n_G$ and $d_K$.

The signal denoting the corrected desired or required engine RPM $n_{MSollk}$ is transmitted to one input of a regulator (module) 46. A presently preferred regulator is a proportional-integral (PI) regulator. Another input of the regulator 46 receives a signal from the sensor 28, i.e., a signal denoting the engine RPM $n_M$. It is often desirable to transmit to the regulator 46 a signal which is representative of the difference $n_{MSollk}-n_M$. The regulator 46 processes such signals and transmits the reference signal $K_W$, denoting a correction value, to the corresponding input of an adding/subtracting module 48 wherein the reference signal $K_W$ is added to or subtracted from the signal $S_K$ being transmitted by the module 40. The output of the module 48 transmits a corrected control or regulating signal $S_{Kr}$ to the input of the actuator 24 for the lever 20 of the automated clutch 4.

The module 48 corrects the control signals $S_K$ in such a way that the engagement of the clutch 4 is increased (i.e., the clutch can transmit a greater torque) when the engine RPM $n_M$ is higher than the desired or required engine RPM $n_{MSoll}$, and that the extent of engagement of the clutch 4 is progressively reduced (below that corresponding to the engagement solely in response to the control signal $S_K$) when the engine RPM $n_M$ drops below the required or desired engine RPM $n_{MSoll}$.

It will be seen that the control unit 26 is designed in such a way that a controlled operation of the clutch 4 (note the module 40) is corrected by a regulation (reference signal $K_W$) which is relatively simple because it need not encompass the entire dynamic range. Nevertheless, the aforedescribed regulation ensures that the operation of the clutch 4 is correct or satisfactory, and corresponds to the engine characteristics, even in the event of external disturbances which are not taken into consideration by heretofore known and used control units for the actuators of automated clutches in the power trains of motor vehicles.

It is to be noted that the aforedescribed algorithms and modules can be modified in a number of ways without departing from the spirit of the invention. For example, the filter (denoted by the block 44 in the diagram of FIG. 2) can be omitted, and the PI regulator (block 46) can be replaced with one of several other types of regulators.

As shown in FIG. 2, the characteristics of the control unit 26 can be changed, or this control unit can be modified or completed, in that the characteristics of the regulator (module denoted by the block 46) can be influenced by the engine RPM $n_M$. For example, it might be of advantage to reduce the proportionality constant and the integration constant of the regulator (such as a PI regulator) to zero, or to a low or an extremely low value, when the engine RPM $n_M$ drops below a preselected threshold value. If such threshold value is exceeded, the proportionality constant and/or the integration constant is reintroduced/increased, either continuously or stepwise or abruptly and completely. Since the integral share remains in the output signal, one need not anticipate any abrupt changes in the desired or required clutch torque. This is of particular advantage when the motor vehicle is being set in motion.

Depending upon the desired or required extent of correction of the control signal $S_K$ and/or upon the desired weighting of the regulator share $K_W$, one can introduce RPM barriers around the desired or required RPM $n_{MSoll}$, or one can introduce a desired or required RPM $n_{KSollk}$ which is limited by gradients. For example, this can take place by making the factor $k_{-22}$ dependent upon the engine RPM $n_M$. The regulator (module denoted by the block 46) is then activated only when the actual RPM values $n_M$ are outside of such barriers. An advantage of the just outlined procedure is that, under normal circumstances, the vehicle is set in motion by continuing to rely merely on simple controlling (control signal $S_K$).

If it is intended to rely upon a more pronounced weighting of the regulator (module denoted by the block 46 in the diagram of FIG. 2), this can be achieved by a reduction of the basic proportionality factor $k_{-22}$ (block 40).

Activity of the regulator renders it possible to draw conclusions regarding system changes. For example, an evaluation of the I share which is generated by the PI regulator (block 46) renders it possible to draw conclusions regarding system changes. If the share is high and negative, the clutch 4 should always be engaged to a greater extent than in the case of a mere controlled operation; this is indicative of a lowered friction coefficient. Such discovery can be diagnosed as a defect of the clutch or, if no defect exists, the characteristic curve which is stored in the module denoted by the block 40 must be corrected.

As already mentioned hereinbefore, in accordance with a modification the output RPM of the transmission 6 (sensor 32 in FIG. 1) can be utilized to ascertain the input RPM of the transmission (sensor 32a can be omitted) by resorting to the prevailing transmission ratio, and the thus ascertained input RPM $n_G$ can be utilized to control the extent of engagement of the friction clutch 4. In accordance with a further modification, it is possible to utilize the RPM of at least one of the wheels 12, 14 for a determination of the input RPM $n_G$ of the transmission 6 by resorting to the prevailing ratio of the power train.

Figure 3A:
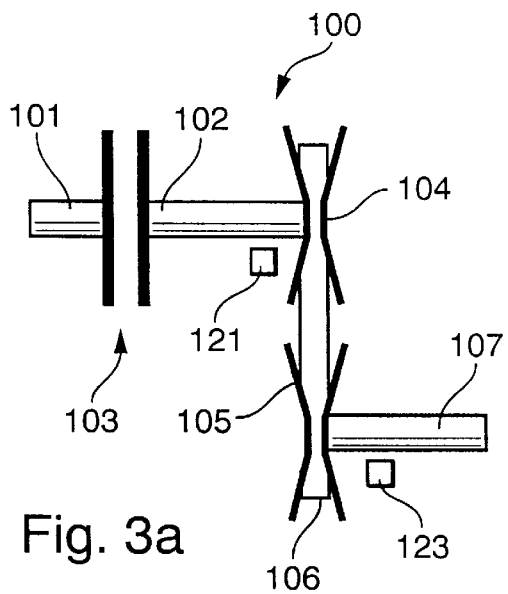
FIG. 3a is a diagrammatic view of a power train which embodies an automated torque transmitting system upstream of a continuously variable transmission in the power train.
Figure 3B:
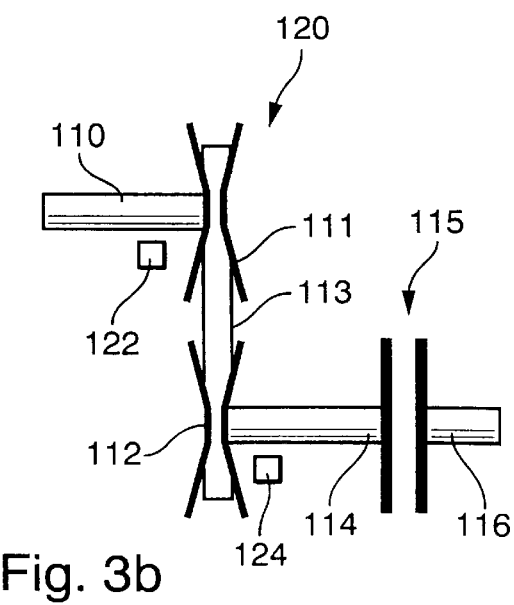
FIG. 3b is a similar diagrammatic view of a power train wherein the torque transmitting system is installed downstream of a continuously variable transmission.

FIGS. 3a and 3b illustrate certain details of two continuously variable transmissions (CVT).

The transmission 100 of FIG. 3a has an input shaft 102 which is (or which receives torque from) the output element (such as the clutch plate or clutch disc 21 in FIG. 1) of a clutch 103. The input element 101 of the clutch 103 receives torque from (or constitutes) the output element of a prime mover. The input shaft 102 drives a first adjustable pulley 104 of the transmission 100, and the pulley 104 transmits torque to a second adjustable pulley 105 by way of an endless flexible element 106 (such as a belt or a chain). The pulley 105 drives an output shaft 107 corresponding to the shaft 8 in the power train of FIG. 1.

The sensors 121, 123 respectively serve to monitor the RPMs of the input shaft 102 and output shaft 107, i.e., the input and output RPMs of the transmission 100.

The transmission 120 of FIG. 3b comprises an input shaft 110 which drives a first adjustable pulley 111. The latter transmits torque to a second adjustable pulley 112 by way of an endless flexible element 113, and the pulley 112 drives a shaft 114 which transmits torque to the input element of a clutch 115. The output element 116 of the clutch 115 can transmit torque to a downstream component of the power train embodying the transmission-clutch combination 120, 115 of FIG. 3b.

The sensors 122, 124 are set up to monitor the RPMs of the input shaft 110 and the shaft 114, respectively, i.e., the input and output RPMs of the transmission 120.

The method of regulating the clutch 4 or 103 or 115 in accordance with one aspect of the present invention can be described as follows:

As already discussed above, the clutch (reference will be had to the automated clutch 4 of FIG. 1) is assumed to be installed in the power train of the motor vehicle and is adjustable (to assume different conditions of engagement or disengagement, i.e., to transmit torques of selected magnitude) by an actuator 24 which receives signals (such as $S_{Kr}$ shown in FIG. 2) from a control unit 26. The signal $S_{Kk}$ is a function of the engine RPM $n_M$, the vehicle speed $n_G$, and he position (inclinatinon $d_K$ of the load regulating device (such as the throttle valve 31 in the engine 2). The signal $S_K$ from the module represented by the block 40 in the diagram of FIG. 2 is corrected in accordance with the output signal $K_W$ of the regulator (denoted by the block 46 in the diagram of FIG. 2). The inputs of the regulator receive signals denoting the desired or required engine RPM $n_{MSoll}$ (derived from the operational parameters of the power train) and the actual engine RPM $n_M$. The correction of the control signal $S_K$ is such that the clutch 4 is adjusted in a sense to reduce the extent of its engagement (i.e., to reduce the magnitude of the transmittable torque) when the actual RPM of the engine 2 is below the desired or required RPM of the engine, and that the clutch is adjusted in a sense to increase the extent of its engagement (i.e., to increase the magnitude of the transmittable torque) when the actual engine RPM is above the desired or required RPM of the engine.

For example, the operational parameters can constitute data denoting the engine RPM (actual RPM), the transmission input RPM, the transmission output RPM, the ratio of the transmission, the magnitude of transmissible clutch torque (i.e., the torque which the clutch can transmit), the speed of the motor vehicle, the angle of the flap of the throttle valve, the timing of the ignition, the ignition angle, the quantity of injected fuel, and the engine torque.

An additional advantage of the improved method is that, when the motor vehicle is to be set in motion, as well as during certain other stages of operation of the motor vehicle, the desired engine RPM (and hence also the desired engine torque $n_M$) is actually selected in accordance with (i.e., as a function of) the extent of depression of the gas pedal by the operator of the motor vehicle.

The improved method does not dispense with the initial selection of the control signal $S_K$ for the actuator 24 (in the module denoted by the block 40). However, a regulation (by the reference signal $K_W$ from the output of the module denoted by the block 46) is superimposed upon the initial control at 40, and such superimposed regulation entails that the control signal $S_K$ is corrected (or can be corrected) in a sense that the difference between the actual RPM of the engine 2 and the predetermined desired or required (preselected) engine RPM is reduced.

Due to such nature of signal generation for the actuator 24, the regulator (module 46) need not cover the entire dynamic range; it merely interferes (i.e., it carries out a regulating function) in response to departures of the actual engine RPM from the desired or required engine RPM in order to ensure that the engine 2 can reach a (predetermined) required or desired RPM, and hence a maximum torque or maximum power or performance, even under those circumstances (e.g., when the throttle valve 31 is fully open) which prevent a conventional power train from furnishing a maximum torque and from operating at a maximum power. For example, the achievement of maximum torque is of great advantage when the motor vehicle is being set in motion while under a pronounced load; such situation will arise when the motor vehicle is coupled with a trailer and is to be set in motion along an upwardly sloping road surface.

The correction, namely the addition of the reference signal $K_W$ to or its subtraction from the control signal $S_K$ in the module denoted by the block 48, is simple and effective and can be carried out with a high degree of accuracy.

The same holds true for the determination of the desired or required engine RPM $n_{MSoll}$ (module represented by the block 42). As already mentioned hereinbefore, the memory of this module can store a characteristic field which is based on parameters denoting the speed of the motor vehicle and the position of the flap of the throttle valve 31. For example, the speed of the motor vehicle can be ascertained on the basis of the input RPM $n_g$ of the transmission 6; such input RPM can be ascertained on the basis of the output RPM of the transmission and the transmission ratio. The ratio is variable if the transmission 6 is a continuously variable transmission (CVT). If the transmission 6 is an automated or manually operable multistage transmission, one can determine the transmission input RPM $n_G$ on the basis of the momentary (fixed) transmission ratio.

The feature that the signal $n_{MSoll}$ denoting the desired or required engine RPM is subjected to a gradient restriction as a function of (a) the difference between the signal $n_M$ denoting the actual engine RPM and the signal $n_{MSoll}$, and (b) the signal $d_K$ denoting the position of the flap of the throttle valve 31, and that the thus corrected signal ($n_{MSollk}$) is transmitted to the corresponding input of the regulator (module represented by the block 46) brings about the advantage that the transition from the actual engine RPM to the desired or required engine RPM is soft and gradual. In addition, and since the actual engine RPM is corrected as a function of the position of the flap of the throttle valve 31, one ensures that a new (and normally lower) desired or required RPM (which is selected in response to a reduction of the load upon the engine) is not altered abruptly but rather in a desirable gradual manner (smoothly). This is particularly desirable in the event of an interruption of an abrupt starting of the motor vehicle.

It is further desirable to design the regulator (module represented by the block 46) in such a way that the regulator becomes effective only when the difference between the signals ($n_M$ and $n_{MSollk}$) which are applied to its inputs reaches or exceeds a preselected value. Thus, and as can be seen by referring to the block diagram of FIG. 2, the regulator (module represented by the block 46) can be set up to become effective only when the departure between the actual engine RPM ($n_M$) and the desired or required engine RPM ($n_{MSollk}$) reaches or exceeds a predetermined or preselected value. Such mode of practicing the improved method ensures that the regulator transmits a reference signal $K_W$ for the generation (at 48) of a corrected signal $S_{Kr}$ only when the undesirable external influences (disturbances) are sufficiently pronounced to warrant a modified operation of the actuator 24 (i.e., an operation other than exclusively in response to the control signals $S_K$).

An advantage of a PI regulator (represented by the block 46) is its simplicity. Moreover, such regulator is sturdy so that it can stand long periods of use. It is to be noted, however, that insofar as the comfort to the occupant(s)

during starting of the motor vehicle is concerned, the primary requirement is that to properly select the desired or required RPM of the rotary output element of the engine.

The features that (a) the characteristic of the regulator is a function of the actual engine RPM, and (b) that the integral- and proportional share of the regulator is set to zero when the actual engine RPM drops below a preselected value bring about the advantage that the regulator can be set to operate only while the motor vehicle is being set in motion and as soon as the engine RPM exceeds a preselected value. The feature (b) exhibits the advantage that, if the regulator is involved or set in operation stepwise as soon as the predetermined engine RPM is exceeded, no abrupt changes of the clutch torque take place because the I share of the PI regulator remains effective.

The calculation of the control signal depends upon the activity of the regulator. This brings about the advantage that, for example, if it is desired to increase the weighting of the regulator, a proportionality factor is reduced in the course of the calculation of control signal.

As already mentioned hereinbefore, an analysis of the share of the regulator (signal $K_W$) in a determination of the signal $S_{Kr}$ renders it possible to draw conclusions regarding changes of the system. For example, if, as a result of high negative I share of the regulator, the clutch must be engaged to an extent exceeding that indicated by the characteristic curve which is memorized in the control unit 26, this can indicate that the characteristic friction of the clutch might have been reduced. This can be remedied by a correction of the characteristic curve.

The improved method can be practiced for controlling the operation of a torque transmitting system (such as the friction clutch 4) which receives torque from an Otto engine, a Diesel engine, or any other suitable prime mover and transmits torque to a driven unit such as a transmission, e.g., a manual or automated or automatic transmission including a planetary, a CVT or other.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of regulating the operation of automated clutches in the power trains of motor vehicles and, therefore, such adaptations should and are intended to be comprehended within the meaning and range of equivalence of the appended claims.

What is claimed is:

1. A method of varying the rate of torque transmission by an adjustable torque transmitting system in a power train forming part of a motor vehicle and having a prime mover with an output element rotatable at RPMs exceeding and below a desired RPM, comprising the steps of:

monitoring the RPM of the output element of the prime mover;

reducing the rate of torque transmission by the torque transmitting system when the monitored RPM is below the desired RPM;

increasing the rate of torque transmission by the torque transmitting system when the monitored RPM exceeds the desired RPM;

generating a first signal denoting the monitored RPM of the output element of the prime mover;

ascertaining the desired RPM including monitoring the RPM of the input element of the transmission and generating a second signal denoting the monitored RPM of the input element of the transmission, monitoring the load upon the prime mover and generating a third signal denoting the monitored load upon the primer mover, and processing said second and third signals into a fourth signal denoting the desired RPM of the prime mover;

generating a control signal including processing said first and second signals, said steps of reducing and increasing the rate of torque transmission by the torque transmitting system including comparing said control signals with said fourth signal;

wherein said step of reducing the rate of torque transmission by the torque transmitting system further includes subtracting the fourth signal from the control signal and said step of increasing the rate of torque transmission by the torque transmitting system further includes adding the fourth signal to the control signal.

2. A method of varying the rate of torque transmission by an adjustable torque transmitting system in a power train forming part of a motor vehicle and having a prime mover with an output element rotatable at RPMs exceeding and below a desired RPM, comprising the steps of:

monitoring the RPM of the output element of the prime mover;

reducing the rate of torque transmission by the torque transmitting system when the monitored RPM is below the desired RPM;

increasing the rate of torque transmission by the torque transmitting system when the monitored RPM exceeds the desired RPM;

generating a first signal denoting the monitored RPM of the output element of the prime mover;

ascertaining the desired RPM including monitoring the RPM of the input element of the transmission and generating a second signal denoting the monitored RPM of the input element of the transmission, monitoring the load upon the prime mover and generating a third signal denoting the monitored load upon the prime mover, and processing said second and third signals into a fourth signal denoting the desired RPM of the prime mover;

generating a control signal including processing said first and second signals;

establishing a difference, if any, between, said first and fourth signals, and performing upon the fourth signal a gradient limitation in dependency (a) upon the established difference between said first and fourth signal and (b) upon said third signal to thus generate a fifth signal, said steps of reducing and increasing the rate of torque transmission by the torque transmitting system including comparing said control signal with said fifth signal.

3. A method of varying the rate of torque transmission by an adjustable torque transmitting system in a power train forming part of a motor vehicle and having a prime mover with an output element rotatable at RPMs exceeding and below a desired RPM, comprising the steps of:

monitoring the RPM of the output element of the prime mover;

reducing the rate of torque transmission by the torque transmitting system when the monitored RPM is below the desired RPM;

increasing the rate of torque transmission by the torque transmitting system when the monitored RPM exceeds the desired RPM;

generating a first signal denoting the monitored RPM of the output element of the prime mover;

ascertaining the desired RPM including monitoring the RPM of the input element of the transmission and generating a second signal denoting the monitored RPM of the input element of the transmission, monitoring the load upon the prime mover and generating a third signal denoting the monitored load upon the prime mover, and processing said second and third signals into a fourth signal denoting the desired RPM of the prime mover;

generating a control signal including processing said first and second signals;

establishing a difference, if any, between said first and fourth signals;

performing upon the fourth signal a gradient limitation in dependency (a) upon the established difference between the first and fourth signals and (b) upon said third signal to thus generate a fifth signal; and processing said fifth signal in a regulator to thus generate a sixth signal, said steps of reducing and increasing the rate of torque transmission by the torque transmitting system including comparing said control signals with said sixth signal.

4. The method of claim 3, wherein said step of processing said fifth signal includes utilizing regulator having inputs for said first and fifth signals and being arranged to compare said first and fifth signals and to generate said sixth signal when the comparison between said first and fifth signals indicates the existence of a difference exceeding a predetermined value.

5. The apparatus of claim 3, wherein said step of processing said fifth signal includes utilizing regulator having inputs for said first and fourth signals and being arranged to compare said first and fourth signals and to generate said sixth signal when the comparison between said first and fourth signals indicates the existence of a difference exceeding a predetermined value.

6. The method of claim 3, wherein the regulator is a PI regulator.

7. The method of claim 3, wherein the regulator has a characteristic which is a function of the monitored RPM of the output element of the prime mover.

8. The method of claim 3, wherein the regulator has adjustable integral- and proportional shares, and further comprising the step of setting said shares to zero when the monitored RPM of the output element of the prime mover is below a predetermined RPM.

9. The method of claim 3, wherein said step of generating control signals includes processing said first and second signals and a correction of the control signal by adding or subtracting an additional signal generated by the regulator.

10. A method of varying the rate of torque transmission by an adjustable torque transmitting system in a power train forming part of a motor vehicle and having a prime mover with an output element rotatable at RPMs exceeding and below a desired RPM, comprising the steps of:

monitoring the RPM of the output element of the prime mover;

reducing the rate of torque transmission by the torque transmitting system when the monitored RPM is below the desired RPM;

increasing the rate of torque transmission by the torque transmitting system when the monitored RPM exceeds the desired RPM, respectively generating first and second signals denoting the monitored RPM and the desired RPM of the output element of the prime mover;

processing said first and second signal, said steps of reducing and increasing the rate of torque transmission by the torque transmitting system including adjusting the torgue transmitting system as a function of the processed first and second signals;

wherein said processing step includes subtracting processed second signal from processed first signal when the monitored RPM of the output element of the prime mover is below the desired RPM, and adding processed second signal to processed first signal when the monitored RPM of the output element of the prime mover is above the desired RPM.

11. A power train for a motor vehicle, comprising:

a prime mover having an output element rotatable at a plurality of different RPMs including a desired RPM;

an adjustable torque transmitting system driven by said output element;

means for operating said system, including means for monitoring the RPM of said output element, means for comparing the monitored RPM with the desired RPM, and means for adjusting said system to reduce the torque being transmitted by said system when the monitored RPM is below the desired RPM and to increase the torque being transmitted by said system when the monitored RPM is above the desired RPM;

wherein said operating means further comprises means for ascertaining the desired RPM, including means for generating a first signal denoting the monitored RPM, means for generating a second signal denoting the magnitude of the load upon said prime mover, and means for processing said first and second signals into a third signal denoting the desired RPM.

12. The power train of claim 11, wherein said operating means further comprises means for regulating said third signal.

13. The power train of claim 11, further comprising a transmission having a rotary input element receiving torque from said torque transmitting system, said operating means further comprising means for generating a first signal denoting the monitored RPM of said output element, means for monitoring the RPM of said input element of said transmission, means for generating a first and second signal denoting the monitored RPM of said input element, means for processing said first and second signals into a control signal, and actuator means responsive to said control signal to adjust said torque transmitting system for the transmission to said input element of a torque which is a function of said control signal.

* * * * *